United States Patent Office 3,346,332
Patented Oct. 10, 1967

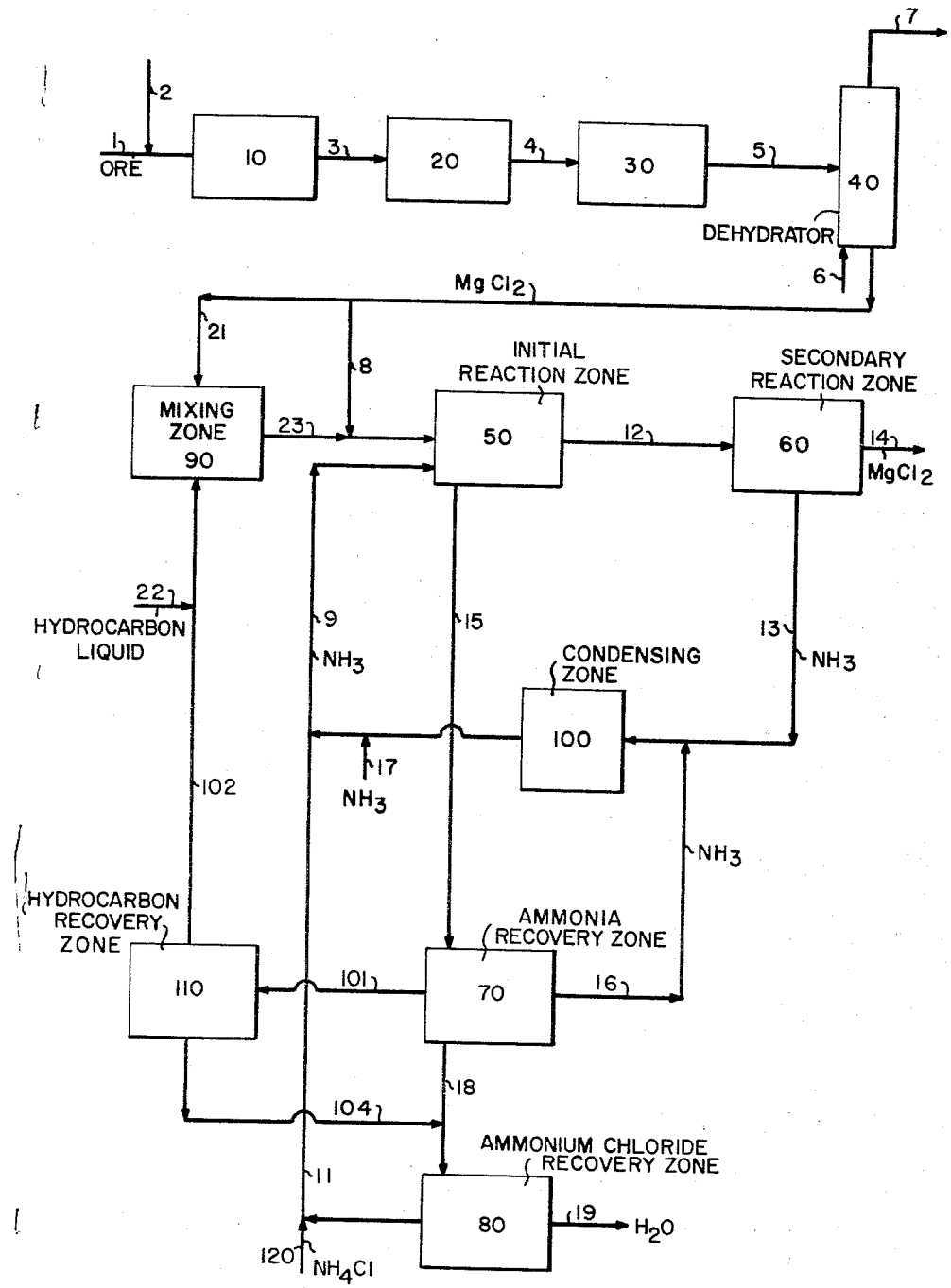

3,346,332
LIQUID SYSTEM-DEHYDRATION OF MAGNESIUM CHLORIDE USING AMMONIA
Eugene Richard Nightingale, Jr., Murray Hill, and Edward J. Barrasso, Livingston, N.J., assignors to Esso Research and Engineering Company, a corporation of Delaware
Filed Mar. 26, 1965, Ser. No. 443,054
9 Claims. (Cl. 23—91)

ABSTRACT OF THE DISCLOSURE

Magnesium chloride is dehydrated by contacting the same with an ammonium solution having a concentration greater than 70% by weight, preferably having a concentration in the range of from 75 to 90% by weight. A preferred adaptation is to mix the hydrated magnesium chloride with a hydrocarbon, preferably a paraffinic hydrocarbon containing from about 6–16 carbon atoms in the molecule before contacting with the ammonium solution. It is also preferred to utilize ammonium chloride in the dehydration zone.

---

The present invention is broadly concerned with the purification and dehydration of magnesium chloride so as to produce anhydrous magnesium chloride which may be further processed as, for example, by means of an electrolytic cell. The invention is specifically concerned with a technique for the dehydration of magnesium chloride utilizing a plurality of integrated processing zones wherein the last traces of water are removed by the use of ammonia. The magnesium chloride hexammoniate product produced is then processed in a manner so as to produce anhydrous magnesium chloride and to regenerate the ammonia for recycling to the system. The specific adaptation of the present invention is to use, in conjunction with the respective stages and the liquid ammonia, a nonaqueous liquid such as a liquid hydrocarbon.

It is known in the art that naturally occurring magnesium chloride, ores or brines, generally contains associated therewith about six molecules of water of hydration $$(MgCl.6H_2O)$$

It is also known in the art that by general dehydration processes it is possible to remove about four molecules of water without securing undesirable side reactions. However, if further dehydration is continued by known techniques in order to remove the remaining two molecules of water, undesirable side reactions occur such as the formation of magnesium hydroxy chloride, magnesium oxide and hydrochloric acid. This is very undesirable, particularly if the magnesium chloride is to be futher processed by electrolysis.

It has now been discovered that, if a plurality of interrelated stages or reaction zones are employed which utilize the technique of replacing the last traces of moisture with ammonia, unexpected desirable results are secured, particularly when a nonaqueous liquid is used in conjunction with the ammonia. By the present technique a high quality, anhydrous magnesium chloride product is secured and the ammonia is readily regenerated for recycling to the system.

The present invention may be more fully understood by reference to the drawing illustrating one embodiment of the same. Referring specifically to the drawing, the magnesium chloride ore as mined is processed by conventional technology to separate out the undesirable insolubles such as gangue, mud, slime, etc. The thus separated magnesium chloride ore is slurried with water and introduced into a first stage evaporation zone 10 by means of line 1. The slurry is produced by the introduction of water by means of line 2. Alternatively, magnesium chloride brine may be introduced into the first stage evaporation zone 10 by means of line 1. The ore or brine is then introduced into a second evaporation zone 20 by means of line 3 and finally into a crystallization stage 30 by means of line 4.

Generally, this pretreatment by the use of evaporation and crystallization stages or zones is conventional and, in essence, comprises a means of concentrating $MgCl_2$ from ores or brines containing soluble constituents such as sodium, potassium, chloride and sulfate ions by use of conventional phase rule technology. One example of the effect of such pretreatment is that the ore, from which the insoluble gangue had been separated, contained on a dry basis about 56 wt. percent $MgCl_2$, about 14 wt. percent $MgSO_4$, about 17 wt. percent $KCl$, and about 13 wt. percent $NaCl$. Following treatment of the slurry in two evaporation stages and one crystallization stage, a bischofite slurry $$(MgCl_2.6H_2O)$$

was obtained in which the composition on a dry basis was about 98 wt. percent $MgCl_2$ (as $MgCl_2.6H_2O$), about 1 wt. percent $KCl$ (as $MgCl_2.KCl.6H_2O$), and about 1 wt. percent $NaCl$. An essential feature of this pretreatment is a means of rejecting undesirable constituents such as the sulfate ion. Depending on the temperatures and pressures of evaporation and crystallization, sulfate may be rejected by precipitation as langbeinite ($K_2SO_4.2MgSO_4$), kainite ($MgSO_4.KCl.3H_2O$) kieserite ($MgSO_4.H_2O$), etc.

Thus, the treated slurry withdrawn from crystallization stage 30 by means of line 5, may vary appreciably and may contain, for example, from about 80 to 99% of $MgCl_2.6H_2O$, from about 0.5 to 10% of $MgCl_2.KCl.6H_2O$, rom about 0.1 to 3% of NaCl and from about 2 to 15% or more of water. Another typical analysis of the slurry withdrawn by means of line 5 is 83.4% $MgCl_2.6H_2O$, 4.6% $MgCl_2.KCl.6H_2O$, about 0.4% NaCl and about 11.6% of water.

In accordance with the present invention, this slurry is introduced into a dehydration zone 40 by means of line 5. Although a kiln may be utilized, it is preferred that dehydration zone 40 be of a conventional fluid bed design in which the fluidizing gas is introduced by means of line 6 and removed overhead by means of line 7 along with water vapor. The dehydration gas or fluidizing gas may be any inert gas such as nitrogen, hot air or combustion gas. It is preferred that the fluidizing gas comprise hot air or combustion gas. The temperature maintained in zone 40 by conventional means is in the range from about 115° C. to about 250° C., preferably about 160° C.

In one embodiment of the present invention, the partially dehydrated magnesium chloride containing about 2 molecules of water of hydration is removed from dehydration zone 40 by means of line 8 and introduced into an initial reaction zone 50. A solution of liquid ammonia containing more than about 70% of ammonia, preferably from about 75% to 90% by weight of ammonia is introduced into initial reaction zone 50 by means of line 9. A desired adaptation is to also introduce ammonium chloride into reaction zone 50 by means of line 11 in which the ammonium chloride is dissolved in the liquid ammonia stream. The ammonium chloride in reaction zone 50 is at a concentration in the range from about 0.5 to 10% by weight, preferably about 2 to 5% by weight. The temperature maintained in initial reaction zone 50 is in the range from about 15° to 95° C., preferably at a temperature of about 60° C. The pressure in reaction zone 50 is maintained in the range from about 100 to 800 lbs., preferably at a pressure of about 350 lbs. Under these conditions the water in the magnesium chloride is replaced to form magnesium chloride hexammoniate $(Mg(NH_3)_6Cl_2)$. The other products are ammonium chloride and water which are dissolved in the liquid ammonia.

In the preferred embodiment of the present invention, the partially dehydrated magnesium chloride containing about 2 molecules of water of hydration is removed from zone 40 by means of line 8 and introduced into a mixing or slurrying zone 90 by means of line 21. A nonaqueous liquid, such as a liquid paraffinic, cycloparaffinic, or aromatic hydrocarbon, preferably a $C_6$ to $C_{16}$ paraffin or benzene, or a mixture thereof, is introduced into zone 90 by means of line 22. The magnesium chloride-hydrocarbon slurry is then introduced into initial reaction zone 50 by means of line 23. The hydrocarbon liquid is at a concentration in reaction zone 50 of from about 1 to 40% by weight, preferably about 20% by weight. Liquid ammonia is introduced into reaction zone 50 by means of line 9. When using a liquid hydrocarbon the liquid ammonia in reaction zone 50 is at a concentration of from about 40 to 95% by weight, preferably about 70% by weight. A preferred adaptation is to also introduce ammonium chloride into reaction zone by means of line 11 in which the ammonium chloride is dissolved in the liquid ammonia stream. The ammonia chloride concentration in reaction zone 50 is in the range from about 0.5 to 10% by weight of ammonium chloride, preferably about 2 to 5% by weight. The temperature maintained in reaction zone 50 is in the range from about 15° to 95° C., preferably at a temperature of about 60° C. The pressure in reaction zone 50 is maintained in the range from about 100 to 800 lbs., preferably at a pressure of about 350 lbs. Under these conditions the water in the magnesium chloride is replaced to form magnesium chloride hexammoniate $(Mg(NH_3)_6Cl_2)$. As pointed out, the other products are ammonium chloride and water which are dissolved in the liquid ammonia and the liquid hydrocarbon.

The addition of a liquid hydrocarbon to initial reaction zone 50 provides an unexpected beneficial effect over and above that of merely providing a convenient means of introducing solid magnesium chloride into a pressurized reaction zone 50. The addition of the liquid hydrocarbon in reaction zone 50 facilitates the removal of water from the partially dehydrated magnesium chloride and makes it easier to obtain a product completely free from water, particularly when the temperature of initial reaction zone 50 is maintained near or above the critical solution temperature of the ammonia hydrocarbon mixture.

The magnesium chloride hexammoniate

is withdrawn from the reaction zone 50 by means of line 12 and introduced into a decomposition chamber or secondary reaction zone 60. The temperature and pressure conditions are adjusted in secondary reaction zone 60 to separate the ammonia which is removed by means of line 13 and to produce anhydrous magnesium chloride $(MgCl_2)$ which is removed by means of line 14. The temperature in secondary reaction zone 60 is maintained in the range from about 270° to 550° C., preferably about 400° C., while the pressure is in the range from 0.1 to 30 atmospheres, preferably from about 1 to 25 atmospheres.

The magnesium chloride is withdrawn from zone 60 by means of line 14 and further processed, preferably by means of an electrolytic cell. The amount of magnesium chloride product produced in the manner described is about 40.6 lbs. of magnesium chloride (96.3% by weight), 1.2 lbs. of KCl (2.8% by weight) and 0.4 lb. of sodium chloride (about 0.9% by weight) per 100 lbs. bischofite slurry.

Liquid ammonia containing dissolved therein water, ammonium chloride and the liquid hydrocarbon is withdrawn from reaction zone 50 by means of line 15 and passed into an ammonia recovery zone 70. Zone 70 is maintained at a temperature in the range from about 25 to 95° C., preferably at about 60° C. The pressure in zone 70 is in the range from about 140 to 800 lbs., preferably about 350 lbs. per sq. in. gauge. Under these conditions, ammonia is removed by means of line 16, combined with the ammonia removed by means of line 13, condensed by suitable means in zone 100 and then recycled to the reaction zone 50. Makeup ammonia may be introduced by means of line 17.

When using the preferred adaptation, a liquid stream free of ammonia is removed from zone 70 by means of line 101 and passed to hydrocarbon recovery zone 110. Temperature conditions in zone 110 are in the range from about 25 to 95° C., preferably at about 45° C., while the pressure is in the range from about 0.1 to 4 atmospheres, preferably at about 1 atmosphere. Under these conditions the hydrocarbon is removed by means of line 102 and then recycled to the system. The stream free of hydrocarbons containing water and ammonium chloride is passed to zone 80 by means of line 104.

If the hydrocarbon is not utilized, the liquid stream from zone 70 is passed directly into ammonium chloride recovery zone 80 by means of line 18. This stream is introduced into ammonium chloride recovery zone 80 wherein the temperature is maintained in the range from about 75 to 150° C., preferably at about 110° C., and the pressure in the range from about 0.1 to 4 atmospheres, preferably at about 1 atmosphere. Under these conditions ammonium chloride is separated and is removed by means of line 11 and recycled to the system while the water is removed by means of line 19. Additional ammonium chloride may be introduced by means of line 120. While the foregoing procedure for separating ammonium chloride pertains to a multistage evaporation system, alternative means, such as spray drying may be employed.

The present invention may be more fully understood by the following example illustrating the same.

*Example*

A number of operations were conducted in the ammonia reactor wherein in Operation A no hydrocarbon was present, but in Operations B and C hydrocarbon was present. The results of these operations are listed in the following table.

TABLE

| Operation | A<br>Without H.C. | B<br>With H.C. | C<br>With H.C. |
|---|---|---|---|
| Composition in $NH_3$ Reactor | ~10 wt. percent salt<br>No HC<br>~90 wt. percent $NH_3$ | ~10 wt. percent salt<br>~20 wt. percent iso-octane<br>~70 wt. percent $NH_3$ | ~10 wt. percent salt.<br>~20 wt. percent n-$C_{16}$ hexadecane.<br>~70 wt. percent $NH_3$. |
| Composition of hydrate feed | $MgCl_2 \cdot 2.36\ H_2O$ | $MgCl_2 \cdot 2.36\ H_2O$ | $MgCl_2 \cdot 3.73\ H_2O$. |
| T of Reactor | 140° F | 145° F | 165° F. |
| P of Reactor | Pressures sufficient to liquefy $NH_3$ as, for instance, in the range 300–400 p.s.i. | | |
| Time of Reaction | 60 min | 45 min | 60 min. |
| Composition of product from $NH_3$ reactor prior to decomposition of complex. | $MgCl_2 \cdot 3.97\ NH_3 \cdot 1.07\ H_2O$ | $MgCl_2 \cdot 6.04\ NH_3$ with less than 0.01 moles of $H_2O$. | $MgCl_2 \cdot 6.01\ NH_3$ with less than 0.01 moles of $H_2O$. |

From the above, it is apparent that the presence of the hydrocarbon in the ammonia reactor materially improved the operation.

What is claimed is:

1. Process for the removal of water of hydration from magnesium chloride which comprises mixing hydrated magnesium chloride with liquid ammonia having a concentration in the range of from about 70 to 90% by weight in an initial reaction zone at a temperature in the range of from about 15° C. to 95° C. and at a pressure in the range of from about 100 to 800 lbs. per sq. in. gauge to replace the water of hydration with ammonia, removing the magnesium chloride hexammoniate from said initial reaction zone and passing the same to a secondary reaction zone, maintaining a temperature in the range from about 270° C. to 550° C. and a pressure in the range from about 0.1 to 3.0 atmospheres in said secondary reaction zone so as to decompose the magnesium ammonium chloride to gaseous ammonia and anhydrous magnesium chloride, removing the ammonia and magnesium chloride as separate streams from said secondary reaction zone, removing a liquid ammonia stream from said initial reaction zone containing dissolved therein the water of hydration, passing the liquid ammonia stream to an ammonia recovery zone for the segregation of the ammonia as a vapor from the water, condensing the ammonia and recycling the same to said initial reaction zone.

2. Process for the removal of water of hydration from magnesium chloride which comprises mixing the hydrated magnesium chloride with a hydrocarbon, thereafter passing the mixture to an initial reaction zone and contacting the mixture with liquid ammonia at a temperature in the range from about 15° C. to 95° C. and at a pressure in the range of from about 100 to 800 lbs. per sq. in. gauge to replace the water of hydration with ammonia, passing the magnesium ammonium chloride to a secondary reaction zone and maintaining a temperature in the range of about 270° C. to 550° C. and at a pressure in the range from 0.1 to 3.0 atmospheres in said secondary reaction zone to separate a vaporous ammonia stream which is removed from said secondary reaction zone and anhydrous magnesium chloride which is removed from said secondary reaction zone, condensing the ammonia stream removed from said secondary reaction zone and recycling the same to said initial reaction zone, withdrawing a liquid ammonia stream containing water and said liquid hydrocarbon from said initial reaction zone and passing the same to an ammonia recovery zone maintained under temperature and pressure conditions to segregate vaporous ammonia, condensing the vaporous ammonia and recycling the same to said initial reaction zone, separating a stream comprising liquid hydrocarbon and water from said ammonia recovery zone and passing the same to a hydrocarbon recovery zone, maintaining temperature and pressure conditions in said hydrocarbon recovery zone under conditions to separate a hydrocarbon stream which is recycled to said initial reaction zone.

3. Process as defined by claim 2 wherein ammonium chloride is introduced into said initial reaction zone and wherein an aqueous stream is separated from said hydrocarbon recovery zone and is passed to an ammonium chloride recovery zone which is maintained under temperature and pressure conditions to separate the ammonium chloride from the water, withdrawing the water and recycling the ammonium chloride to said initial reaction zone.

4. Process as defined by claim 2 wherein the amount of hydrocarbon mixed with the hydrated magnesium chloride is in the range from about 1 to 40% by weight.

5. Process as defined by claim 2 wherein the amount of ammonia used in said initial reaction zone is in the range from about 70 to 95% by weight.

6. Process as defined by claim 3 wherein the amount of ammonium chloride used in said initial reaction zone is in the range from about 0.5 to 10% by weight.

7. Process as defined by claim 2 wherein the hydrocarbon used is a paraffinic hydrocarbon containing from about 6 to 16 carbon atoms in the molecule.

8. Process as defined by claim 2 wherein said hydrocarbon is selected from the class consisting of paraffins, isoparaffins, cycloparaffins and aromatics.

9. Process as defined by claim 1 wherein a soluble ammonium salt selected from the class consisting of ammonium chloride, ammonium acetate, ammonium thiocyanate and ammonium nitrate is added to the initial reaction zone.

References Cited

UNITED STATES PATENTS

| | | | |
|---|---|---|---|
| 2,381,995 | 8/1945 | Belchetz | 23—91 |
| 3,092,450 | 6/1963 | Christensen et al. | 23—91 |

OSCAR R. VERTIZ, *Primary Examiner.*

EDWARD STERN, *Examiner.*